(12) United States Patent
Liu et al.

(10) Patent No.: US 12,075,716 B2
(45) Date of Patent: Sep. 3, 2024

(54) ROTARY TILLAGE, SOWING, DITCHING AND PRESSING COMPOUND OPERATION MACHINE

(71) Applicant: JIANGSU UNIVERSITY, Zhenjiang (CN)

(72) Inventors: Wei Liu, Zhenjiang (CN); Jianping Hu, Zhenjiang (CN); Jun Zhao, Zhenjiang (CN); Huagang Xu, Zhenjiang (CN); Yonghui Zhang, Zhenjiang (CN); Xingsheng Zhao, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/575,367

(22) PCT Filed: Dec. 8, 2021

(86) PCT No.: PCT/CN2021/136270
§ 371 (c)(1),
(2) Date: Apr. 3, 2024

(87) PCT Pub. No.: WO2022/127657
PCT Pub. Date: Jun. 23, 2022

(65) Prior Publication Data
US 2024/0260495 A1    Aug. 8, 2024

(30) Foreign Application Priority Data
Dec. 14, 2020    (CN) .......................... 202011468160.0

(51) Int. Cl.
*A01B 49/06*    (2006.01)
*A01B 29/02*    (2006.01)
(Continued)

(52) U.S. Cl.
CPC .............. *A01B 49/06* (2013.01); *A01B 29/02* (2013.01); *A01B 35/08* (2013.01); *A01B 61/046* (2013.01); *A01B 63/008* (2013.01)

(58) Field of Classification Search
CPC ......... A01B 49/06; A01B 29/02; A01B 35/08; A01B 63/008; A01B 61/046; A01B 49/04;
(Continued)

(56) References Cited

FOREIGN PATENT DOCUMENTS

| CN | 203801224 U | 9/2014 |
|---|---|---|
| CN | 206196288 U | 5/2017 |

(Continued)

*Primary Examiner* — Christopher J. Novosad
(74) *Attorney, Agent, or Firm* — Bayramoglu Law Offices LLC

(57) ABSTRACT

A rotary tillage, sowing, ditching and pressing compound operation machine includes a fertilization and sowing device, an intermediate rotary tillage and ditching device, a frame, a liftable ditcher, and a multi-stage press wheel device. The multi-stage press wheel device includes a front press wheel and a rear press wheel. The front press wheel includes a front press roller shaft, front press rollers, and connecting rods. The rear press wheel includes a connecting plate, a rear press roller shaft, and a rear press roller. A first end of the connecting plate is connected to the rear press roller shaft by a support, and the connecting plate is connected to the frame in a manner of a sliding pair. The rear press roller is mounted on the rear press roller shaft in a manner of a revolving pair, and the rear press roller is located behind the liftable ditcher.

6 Claims, 4 Drawing Sheets

(51) Int. Cl.
*A01B 35/08* (2006.01)
*A01B 61/04* (2006.01)
*A01B 63/00* (2006.01)

(58) Field of Classification Search
CPC ......... A01B 49/00; A01B 29/00; A01B 35/04; A01B 35/02; A01B 35/00; A01B 63/002; A01B 63/00; A01B 61/044; A01B 61/04; A01B 61/00
See application file for complete search history.

(56) References Cited

FOREIGN PATENT DOCUMENTS

| | | | |
|---|---|---|---|
| CN | 110393049 | A | 11/2019 |
| CN | 111656894 | A | 9/2020 |
| CN | 112616336 | A | 4/2021 |
| EP | 0015800 | A1 | 9/1980 |

ROTARY TILLAGE, SOWING, DITCHING AND PRESSING COMPOUND OPERATION MACHINE

CROSS REFERENCE TO THE RELATED APPLICATIONS

This application is the national phase entry of International Application No. PCT/CN2021/136270, filed on Dec. 8, 2021, which is based upon and claims priority to Chinese Patent Application No. 202011468160.0, filed on Dec. 14, 2020, the entire contents of which are incorporated herein by reference.

TECHNICAL FIELD

The present disclosure relates to the technical field of agricultural machinery, and specifically to a rotary tillage, sowing, ditching and pressing compound operation machine.

BACKGROUND

Jianghuai region is one of the main wheat producing areas in China, and adopts a rice-wheat rotation planting system. In recent years, with the economic growth and the improvement of people's living standards in this region, more and more young adult laborers choose to work away from their hometowns, the elderly accounts for a larger proportion in the rural left-behind population, and the laborers engaged in agricultural production are becoming fewer and fewer. In addition, with the increase of subsidies for large and medium-sized tractors, compound and multi-functional agricultural machinery in China, intensive planting has become a trend, and small-sized single-function seeders can no longer meet the requirements of mechanized production and large-sized tractors, and compound operation machines have gradually become the mainstream in this region. Because there is a large amount of precipitation in Jianghuai region of China, planting in rice stubble fields generally requires ditching for drainage to ensure smooth drainage when raining and prevent the accumulation of rainwater in the fields and the ditches after the raining, thereby preventing the occurrence of wet damage. At present, most ditching operations are performed by manpower or ditching machines after rotary tillage and sowing. Such a way is cumbersome and time- and labor-consuming. However, the existing rotary tillage and fertilization seeders that can lift the ditcher have the problem that when the ditching operation is not performed, the soil at the original ditching position cannot be pressed, affecting seed germination. Therefore, currently there is a need for a rotary tillage, fertilization, sowing and ditching compound operation machine with a linkage between ditching operation and pressing operation.

SUMMARY

In view of the drawbacks in the prior art, the present disclosure provides a rotary tillage, sowing, ditching and pressing compound operation machine, which can perform rotary tillage, fertilization, sowing, ditching and pressing operations in a full-operation width with more excellent operation quality, in order to facilitate seed germination, reasonably utilize land resources, and improve the crop yield.

The above technical objective of the present disclosure is attained with the following technical means.

A rotary tillage, sowing, ditching and pressing compound operation machine is provided, including a fertilization and sowing device, an intermediate rotary tillage and ditching device, and a frame, where the intermediate rotary tillage and ditching device is mounted at a lower part of the frame, and the fertilization and sowing device connected to the frame is arranged above the intermediate rotary tillage and ditching device; and further including a liftable ditcher and a multi-stage press wheel device, where the liftable ditcher is mounted behind ditching rotary tillage blades of the intermediate rotary tillage and ditching device to perform a ditching operation in cooperation with the ditching rotary tillage blades;

the multi-stage press wheel device includes a front press wheel and a rear press wheel, and the front press wheel includes a front press roller shaft, front press rollers, and connecting rods; the front press rollers are respectively mounted on two sides of the front press roller shaft each in a manner of a revolving pair, two ends of the front press roller shaft are respectively sheathed in first ends of the connecting rods, and second ends of the connecting rods are hingedly connected to the frame; the front press rollers are located behind rotary tillage blades of the intermediate rotary tillage and ditching device;

the rear press wheel includes a connecting plate, a rear press roller shaft, and a rear press roller; a first end of the connecting plate is connected to the rear press roller shaft by a support, and the connecting plate is connected to the frame in a manner of a sliding pair; the rear press roller is mounted on the rear press roller shaft in a manner of a revolving pair, and the rear press roller is located behind the liftable ditcher; and a second end of the connecting plate is connected to the liftable ditcher to achieve a switching of operation states of the liftable ditcher and the rear press wheel.

Further, a sliding groove is arranged in a middle of the connecting plate, a sliding groove guide column is arranged on the frame, the sliding groove guide column is located in the sliding groove, and a movement of the connecting plate and the frame in the manner of the sliding pair is enabled by an operation of the liftable ditcher.

Further, the support includes two vertical connecting rods and a cross beam, two ends of the rear press roller shaft are respectively connected to first ends of the two vertical connecting rods, second ends of the two vertical connecting rods are connected by the cross beam, and the cross beam is connected to the connecting plate.

Further, the liftable ditcher includes a ditching shovel, a connecting rod mechanism, and a driving mechanism, where the ditching shovel is connected to the driving mechanism through the connecting rod mechanism, a hinge point of the connecting rod mechanism is connected to the second end of the connecting plate, and operation states of the ditching shovel and the rear press wheel are switched synchronously through the driving mechanism.

Further, when the driving mechanism drives, through the connecting rod mechanism, the ditching shovel into a ditching operation state, the connecting rod mechanism drives, through the connecting plate, the rear press wheel into a non-operating state; and when the driving mechanism drives, through the connecting rod mechanism, the ditching shovel into a non-operating state, the connecting rod mechanism drives, through the connecting plate, the rear press wheel into a pressing operation state.

Further, a vertical rod is mounted between each of the connecting rods and the frame, and a compression spring is sleeved on the vertical rod.

The advantages of the present disclosure are as follows.

In the rotary tillage, sowing, ditching and pressing compound operation machine of the present disclosure, the arrangement of the front press wheel in the multi-stage press wheel can avoid crushing the ditch edge formed during the ditching operation, and the rear press wheel linked with the ditching operation can ensure that the soil after rotary tillage in the entire width can be pressed tightly when the ditching operation is not performed, thereby facilitating seed germination.

Figure 1:
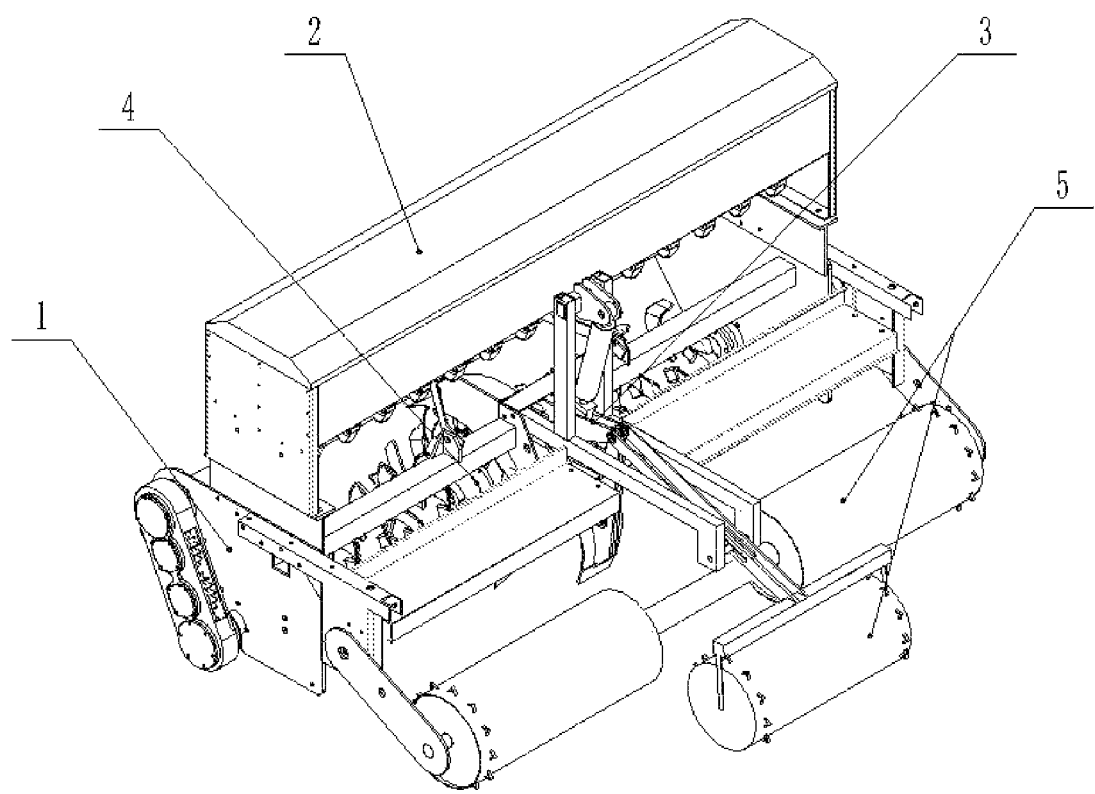
FIG. 1 is a schematic structural diagram of a rotary tillage, sowing, ditching and pressing compound operation machine according to the present disclosure.

1-frame; 2-fertilization and sowing device; 3-liftable ditcher; 4-intermediate rotary tillage and ditching device; 5-multi-stage press wheel device; 12-main beam of the frame; 13-cross beam of the frame; 31-ditching shovel; 32-ditching shovel plow; 33-support arm; 34-hydraulic cylinder; 35-lifting crank; 41-rotary tillage blade shaft; 42-intermediate ditching cutter head; 43-ditching rotary tillage blade; 44-rotary tillage blade; 51-front press wheel; 511-front press roller shaft; 512-front press roller; 513-vertical rod; 514-connecting rod; 515-compression spring; 52-rear press wheel; 521-connecting plate; 522-sliding groove guide column; 523-rear press roller shaft; 524-rear press roller; 525-vertical connecting rod; 526-cross beam; 527-rectangular tube.

DETAILED DESCRIPTION OF THE EMBODIMENTS

Embodiments of the present disclosure will be described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

Figure 2:
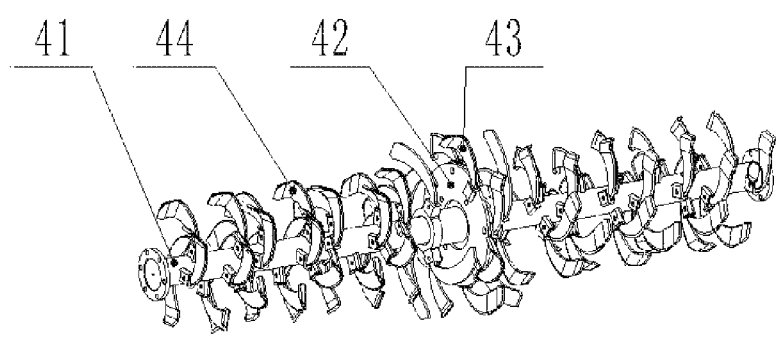
FIG. 2 is a schematic diagram of an intermediate rotary tillage and ditching device according to the present disclosure.

As shown in FIG. 1, a rotary tillage, sowing, ditching and pressing compound operation machine of the present disclosure includes a fertilization and sowing device 2, an intermediate rotary tillage and ditching device 4, a frame 1, a liftable ditcher 3, and a multi-stage press wheel device 5. The intermediate rotary tillage and ditching device 4 is mounted horizontally at a lower part of the frame 1, and the fertilization and sowing device 2 connected to the frame 1 is arranged above the intermediate rotary tillage and ditching device 4. As shown in FIG. 2, the intermediate rotary tillage and ditching device 4 includes a rotary tillage blade shaft 41, an intermediate ditching cutter head 42, ditching rotary tillage blades 43, and rotary tillage blades 44. The rotary tillage blade shaft 41 is horizontally mounted on the frame. The intermediate ditching cutter head 42 rotating synchronously with the rotary tillage blade shaft 41 is fixed at a middle position on the rotary tillage blade shaft 41. The intermediate ditching cutter head 42 is of a planar circular structure and is perpendicular to the rotary tillage blade shaft 41. The ditching rotary tillage blades 43 are respectively fixed on two sides of the intermediate ditching cutter head 42. When the rotary tillage blade shaft 41 rotates, the intermediate ditching cutter head 42 drives the ditching rotary tillage blades 43 to rotate so as to loosen the soil. In addition to the ditching rotary tillage blades 43, a plurality of sets of rotary tillage blades 44 are arranged in sequence on the rotary tillage blade shaft 41. Each set of rotary tillage blades 44 includes a plurality of rotary tillage blades arranged in a circumferential direction for rotary tillage of land.

Figure 3:
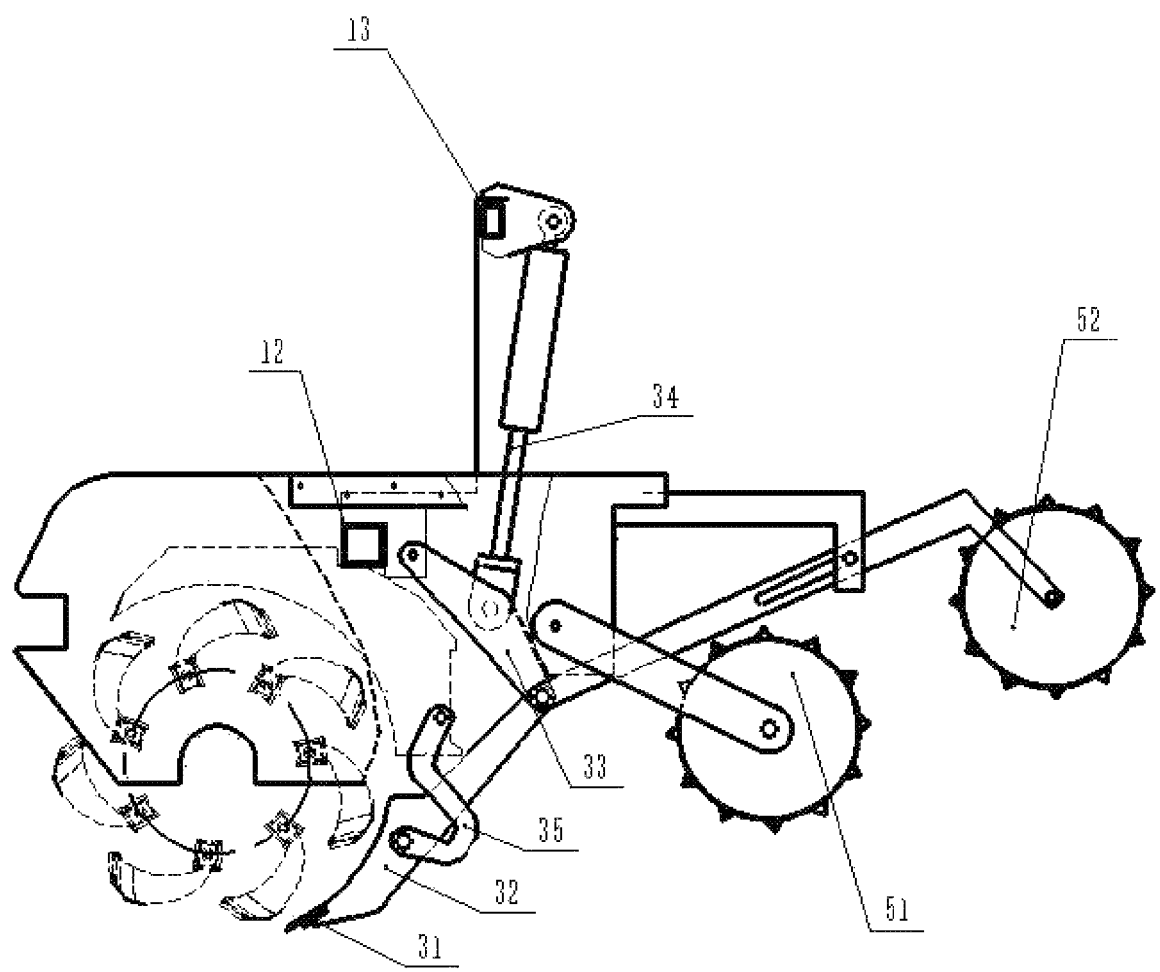
FIG. 3 is a schematic diagram of a liftable ditcher according to the present disclosure.

The liftable ditcher 3 is configured to lift a ditching shovel, so as to cooperate with the front ditching rotary tillage blades to perform ditching operation to shovel out a drainage ditch. FIG. 3 shows an embodiment of the liftable ditcher 3. The liftable ditcher 3 includes a ditching shovel 31, a ditching shovel plow 32, a support arm 33, a hydraulic cylinder 34, and a lifting crank 35. A first end of the support arm 33 is hingedly connected to a main beam 12 of the frame. A first end of the hydraulic cylinder 34 is mounted to a cross beam 13 of the frame, and a second end of the hydraulic cylinder 34 is hingedly connected to a middle of the support arm 33, to cause the support arm 33 to rotate in a vertical plane about the point at which the support arm 33 is hingedly connected to the frame 1. A second end of the support arm 33 is connected to the ditching shovel plow 32. The ditching shovel 31 is fixedly mounted to the ditching shovel plow 32. A first end of the lifting crank 35 is hingedly connected to the frame 1, and a second end of the lifting crank 35 is connected to the ditching shovel plow 32. The support arm 33, the ditching shovel plow 32, and the lifting crank 35 move simultaneously, to cause the ditching shovel 31 to form a reasonable movement trajectory. During ditching, the position of ditching shovel 31 is adjusted according to actual operation requirements. A horizontal position of a tip of the ditching shovel 31 is higher than the lowest point of a trajectory circle of a tip of each of the ditching rotary tillage blades 43. There is a gap between the tip of the ditching shovel 31 and the trajectory circle of the tip of each of the ditching rotary tillage blades 43 in a horizontal direction. A diameter of a trajectory circle of the tip of the ditching shovel 31 is not more than 2 cm larger than a diameter of the trajectory circle of the tip of each of the ditching rotary tillage blades 43.

Figure 4:
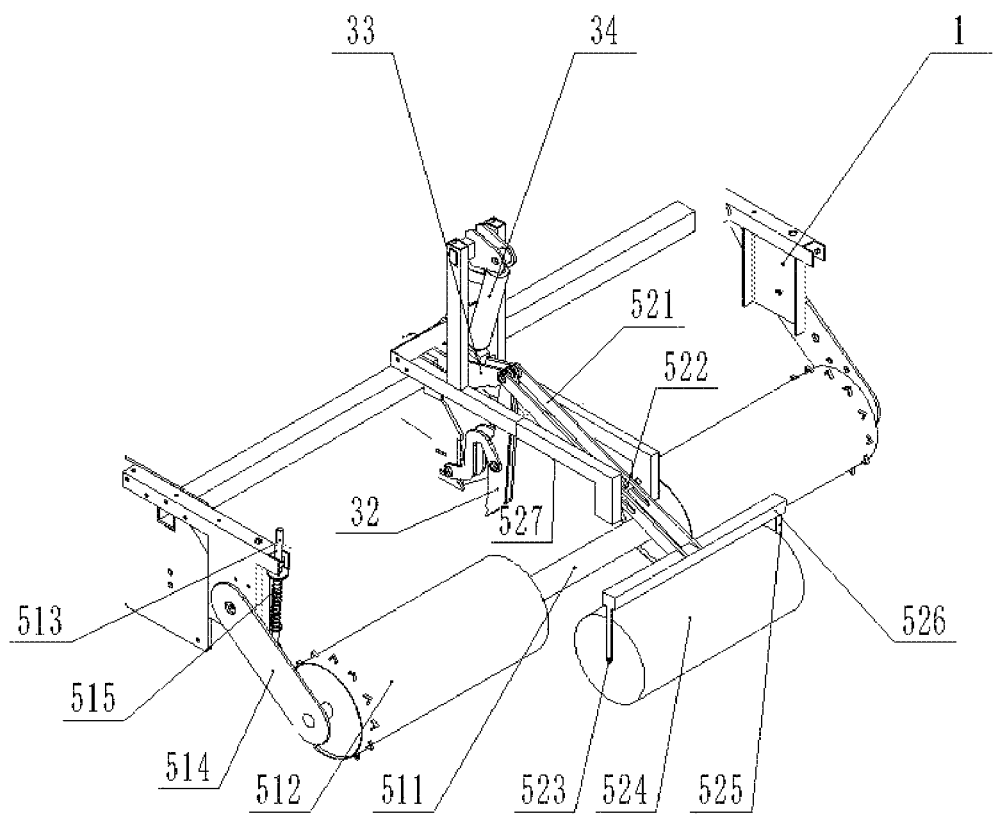
FIG. 4 is a schematic diagram of a multi-stage press wheel according to the present disclosure.

As shown in FIG. 4, the multi-stage press wheel device 5 includes a front press wheel 51 and a rear press wheel 52. The front press wheel includes a front press roller shaft 511, front press rollers 512, vertical rods 513, connecting rods 514, and compression springs 515. The front press rollers 512 are respectively mounted on two sides of the front press roller shaft 511 each in a manner of a revolving pair. Two ends of the front press roller shaft 511 are respectively sheathed in first ends of the connecting rods 514. Second ends of the connecting rods 514 are hingedly connected to the frame. The front press rollers 512 are located behind the rotary tillage blades 44 of the intermediate rotary tillage and ditching device 4. A surface of each of the connecting rods 514 is fixedly connected to a respective one of the vertical rods 513. The compression springs 515 are respectively sleeved on the vertical rods 513. The rear press wheel 52 includes a connecting plate 521, a sliding groove guide column 522, a rear press roller shaft 523, a rear press roller 524, two vertical connecting rods 525, and a cross beam 526. The rear press roller 524 is mounted on the rear press roller shaft 523 in a manner of a revolving pair. The rear press roller 524 is located behind the liftable ditcher 3. The vertical connecting rods 525 are sleeved over an outer surface of the rear press roller shaft 523. The other ends of the vertical connecting rods 525 are rigidly connected to the cross beam 526. The cross beam 526 is connected to a first end of the connecting plate 521. A second end of the connecting plate 521 and the ditching shovel plow 32 are hingedly connected to the same position at the second end of the support arm 33. A sliding groove is arranged in a middle of the connecting plate 521. The sliding groove guide column 522 is connected to the frame 1 through rectangular tubes 527, and the sliding groove guide column 522 is configured to move back and forth in the sliding groove.

Operation Process:

When the ditching operation needs to be performed, the hydraulic cylinder 34 is extended to drive the support arm 33 to move downward in the vertical plane about the point at which the support arm 33 is hingedly connected to the frame main beam 12. Under the joint action of the support arm 33 and the lifting crank 35, the ditching shovel plow 32 reaches a predetermined position, so that the diameter of the trajectory circle of the tip of the ditching shovel 31 rigidly connected to the ditching shovel plow 32 is not more than 2 cm larger than the diameter of the trajectory circle of the tip of each of the ditching rotary tillage blades 43, and the horizontal position of the tip of the ditching shovel 31 is higher than the lowest point of the trajectory circle of the tip of each of the ditching rotary tillage blades 43. At the same time, the end of the connecting plate 521 in the rear press wheel 52 connected to the support arm 33 moves downward, and the end of the connecting plate 521 close to the rear press roller 524 is lifted. In this case, the rear press wheel 52 does not participate in the pressing operation, and only the ditching shovel 31 and the front press wheel 51 respectively perform the ditching operation and the pressing operation. When no ditching operation needs to be performed, the hydraulic cylinder 34 is shortened to drive and the support arm 33 to move upward around the main beam 12 of the frame to lift the ditching shovel plow 32 and the ditching shovel 31. In this case, the ditching shovel 31 no longer carries out the ditching operation, and correspondingly, under the joint action of the support arm 33, the connecting plate 521, and the sliding groove guide column 522, the rear press wheel 52 is lowered to a suitable position to perform the pressing operation, so that the rear press wheel 52 and the front press wheel 51 jointly complete the full-width pressing operation.

The embodiments are preferred embodiments of the present disclosure, but the present disclosure is not limited to the above-mentioned embodiments. Without departing from the spirit of the present disclosure, any obvious improvement, replacement or variation that can be made by the person skilled in the art belongs to the protection scope of the present disclosure.

What is claimed is:

1. A rotary tillage, sowing, ditching and pressing compound operation machine, comprising a fertilization and sowing device, an intermediate rotary tillage and ditching device, and a frame, wherein the intermediate rotary tillage and ditching device is mounted at a lower part of the frame, and the fertilization and sowing device connected to the frame is arranged above the intermediate rotary tillage and ditching device; and further comprising a liftable ditcher and a multi-stage press wheel device, wherein the liftable ditcher is mounted behind ditching rotary tillage blades of the intermediate rotary tillage and ditching device to perform a ditching operation in cooperation with the ditching rotary tillage blades;

the intermediate rotary tillage and ditching device comprises a rotary tillage blade shaft, an intermediate ditching cutter head, the ditching rotary tillage blades, and a plurality of sets of rotary tillage blades; the rotary tillage blade shaft is horizontally mounted on the frame, the intermediate ditching cutter head rotating synchronously with the rotary tillage blade shaft is fixed at a middle position on the rotary tillage blade shaft, and the ditching rotary tillage blades are respectively fixed on two sides of the intermediate ditching cutter head; the plurality of sets of rotary tillage blades are arranged on the rotary tillage blade shaft;

the multi-stage press wheel device comprises a front press wheel and a rear press wheel, and the front press wheel comprises a front press roller shaft, front press rollers, and connecting rods; the front press rollers are respectively mounted on two sides of the front press roller shaft each in a manner of a revolving pair, two ends of the front press roller shaft are respectively sheathed in first ends of the connecting rods, and second ends of the connecting rods are hingedly connected to the frame; the front press rollers are located behind the rotary tillage blades of the intermediate rotary tillage and ditching device;

the rear press wheel comprises a connecting plate, a rear press roller shaft, and a rear press roller; a first end of the connecting plate is connected to the rear press roller shaft by a support, and the connecting plate is connected to the frame in a manner of a sliding pair; the rear press roller is mounted on the rear press roller shaft in a manner of a revolving pair, and the rear press roller is located behind the liftable ditcher; and a second end of the connecting plate is connected to the liftable ditcher to achieve a switching of operation states of the liftable ditcher and the rear press wheel.

2. The rotary tillage, sowing, ditching and pressing compound operation machine according to claim 1, wherein a sliding groove is arranged in a middle of the connecting plate, a sliding groove guide column is arranged on the frame, the sliding groove guide column is located in the sliding groove, and a movement of the connecting plate and the frame in the manner of the sliding pair is enabled by an operation of the liftable ditcher.

3. The rotary tillage, sowing, ditching and pressing compound operation machine according to claim 1, wherein the support comprises two vertical connecting rods and a cross beam, two ends of the rear press roller shaft are respectively connected to first ends of the two vertical connecting rods, second ends of the two vertical connecting rods are connected by the cross beam, and the cross beam is connected to the connecting plate.

4. The rotary tillage, sowing, ditching and pressing compound operation machine according to claim 1, wherein the liftable ditcher comprises a ditching shovel, a connecting rod mechanism, and a driving mechanism, wherein the ditching shovel is connected to the driving mechanism through the connecting rod mechanism, a hinge point of the connecting rod mechanism is connected to the second end of the connecting plate, and operation states of the ditching shovel and the rear press wheel are switched synchronously through the driving mechanism.

5. The rotary tillage, sowing, ditching and pressing compound operation machine according to claim 4, wherein when the driving mechanism drives, through the connecting rod mechanism, the ditching shovel into a ditching operation state, the connecting rod mechanism drives, through the connecting plate, the rear press wheel into a non-operating state; and when the driving mechanism drives, through the connecting rod mechanism, the ditching shovel into a non-operating state, the connecting rod mechanism drives, through the connecting plate, the rear press wheel into a pressing operation state.

6. The rotary tillage, sowing, ditching and pressing compound operation machine according to claim 1, wherein a vertical rod is mounted between each of the connecting rods and the frame, and a compression spring is sleeved on the vertical rod.

* * * * *